(12) United States Patent
Fauteux et al.

(10) Patent No.: US 6,613,475 B2
(45) Date of Patent: Sep. 2, 2003

(54) ELECTROCHEMICAL CELL HAVING A PRE-PASSIVATED ELECTRODE AND ASSOCIATED FABRICATION PROCESS

(75) Inventors: Denis G. Fauteux, Acton, MA (US); Eric S. Kolb, Action, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/981,316

(22) Filed: Oct. 16, 2001

(65) Prior Publication Data

US 2002/0086206 A1 Jul. 4, 2002

Related U.S. Application Data

(63) Continuation-in-part of application No. 09/315,721, filed on May 20, 1999, now Pat. No. 6,495,287.

(51) Int. Cl.[7] .................................................. H01M 4/58
(52) U.S. Cl. ...................................... 429/215; 429/231.9
(58) Field of Search .............................. 429/215, 218.1, 429/212, 213, 231.8, 231.9

(56) References Cited

U.S. PATENT DOCUMENTS 5,167,969 A * 12/1992 DeMaio, et al. ............ 425/388
5,853,917 A * 12/1998 Fauteux et al. ............. 429/331

* cited by examiner

*Primary Examiner*—Tom Dunn
*Assistant Examiner*—Jonathan Johnson
(74) *Attorney, Agent, or Firm*—Factor & Partners (57) ABSTRACT

The present invention relates to an electrode for an electrochemical cell comprising: a current collecting substrate; an active material layer associated with the substrate; and solid electrolyte interface layer associated with the active material layer, the solid electrolyte interface layer containing a reaction product of an aromatic compound.

6 Claims, 5 Drawing Sheets

ELECTROCHEMICAL CELL HAVING A PRE-PASSIVATED ELECTRODE AND ASSOCIATED FABRICATION PROCESS

CROSS REFERENCE TO RELATED APPLICATION

This is a continuation-in-part of application Ser. No. 09/315,721, filed May 20, 1999 now U.S. Pat. No. 6,495,287.

BACKGROUND OF THE INVENTION

The present invention relates to an electrode for an electrochemical cell, having a solid electrolyte interface layer. More specifically, the present invention relates to an electrode for an electrochemical cell, having a solid electrolyte interface layer (passivated layer) which is associated with an active material layer, prior to application of the initial electrical charge. The present invention also relates to a process for producing the electrode and an electrochemical cell having the said electrode.

Lithium based electrochemical cells, such as lithium ion secondary batteries, have been known in the art for several years. Furthermore, passivated electrodes or electrodes having a solid electrolyte interface (SEI) for use in lithium based batteries have recently explored. In accordance with conventional technology, passivation of the electrode occurs during the initial charge/discharge cycle by sacrificing a portion of the cell's capacity to form the SEI, which, in turn, results in a battery having lowered capacity and coulombic efficiency.

As a result of the present inventors' earnest studies to solve the above problem, it has been found that the above problem can be solved by using an electrode for an electrochemical cell, previously having a solid electrolyte interface layer.

The present invention has been attained on the basis of the above finding.

SUMMARY OF THE INVENTION

The first object of the present invention is to provide an electrode for an electrochemical cell which is capable of preventing from reducing capacity and coulombic efficiency which occurs during the initial charge/discharge cycle by forming the SEI.

The second object of the present invention is to provide an electrochemical cell comprising the said electrode.

The third object of the present invention is to provide a process for producing the said electrode.

The fourth object of the present invention is to provide a process for producing an electrochemical cell having the said electrode.

To attain the above aim, in the first aspect of the present invention, there is provided an electrode for an electrochemical cell comprising:
  a current collecting substrate;
  an active material layer associated with the substrate; and
  solid electrolyte interface layer associated with the active material layer,
  the solid electrolyte interface layer containing a reaction product of an aromatic compound.

In the first aspect, it is preferred that the current collecting substrate comprises a metallic mesh. Further, it is preferred that the active material layer include at least one kind of carbonaceous particle.

In the second aspect of the present invention, there is provided an electrochemical cell comprising a first electrode, a second electrode and an electrolyte associated with said first and second electrodes,
  at least one of said first electrode and second electrode comprising a current collecting substrate and an active material layer associated with said current collecting substrate,
  a solid electrolyte interface being formed on at least one part of surface of the active material by reacting the surface thereof with an aromatic compound.

In the second aspect, it is preferred that the current collecting substrate of at least one of said first electrode and second electrode comprises a metallic mesh. Further, it is preferred that the active material layer of at least one of said first electrode and second electrode include at least one kind of carbonaceous particle.

In the third aspect of the present invention, there is provided a process for producing a pre-passivated electrode for an electrochemical cell, comprising the steps of:
  forming a solid electrolyte interface onto at least one part of surface of an active material by contacting the surface thereof with an aromatic compound, and
  forming an active material layer comprising the active material having the solid electrolyte interface on a current collecting substrate.

In the third aspect, it is preferred that the aromatic compound comprises a metal salt of aromatic compound.

In the fourth aspect of the present invention, there is provided a process for producing an electrochemical cell having a first electrode, a second electrode and an electrolyte, which process comprises:
  forming a solid electrolyte interface onto at least one part of surface of an active material by contacting the surface thereof with an aromatic compound, and
  forming an active material layer comprising the active material having the solid electrolyte interface on at least one part of surface thereof, on a current collecting substrate to form at least one first electrode and second electrode, and
  associating said electrodes with said electrolyte.

In the fourth aspect, it is preferred that the process further comprises a step of forming a coat on the surface of the active material by an initial charge.

In the fourth aspect, it is preferred that the electrolyte contains as additive.

DETAILED DESCRIPTION OF THE INVENTION

While the present invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Figure 1:
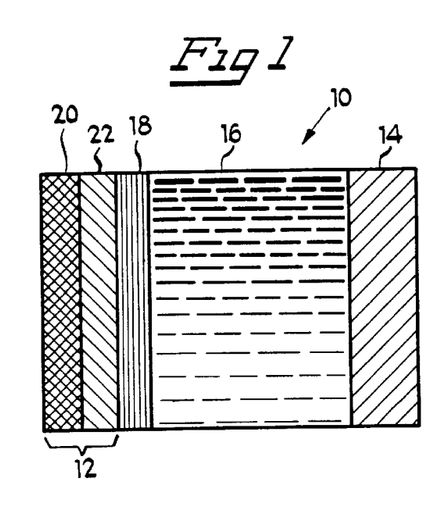
FIG. 1 is a schematic representation of an electrochemical cell fabricated in accordance with the present invention.

Electrochemical cell 10 is shown in FIG. 1, prior to application of an initial electrical charge, as generally comprising first electrode 12, second electrode 14, electrolyte 16 and passivation layer or solid electrolyte interface layer (SEI) 18.

First electrode 12 comprises current collecting substrate 20 and active material layer 22. Preferably current collecting substrate 20 is a metallic mesh, fabricated from, for example, copper. Active material layer 22 includes conventional components and preferably includes at least one carbonaceous particle such as carbon black or graphite. Although not shown current collecting substrate 20 can be coated with a conventional primer to increase adhesion between the substrate and active material layer.

For purposes of the present disclosure, electrolyte 16 includes a conventional salt, such as $LiAsF_6$, dissolved in a conventional solvent, such as propylene carbonate (PC) or ethylene carbonate (EC), although other commercially available and conventionally used solvents and salts or electrolyte systems, such as liquid, polymer, and gel systems, as would be readily understood to those having ordinary skill in the art with the present disclosure before them are likewise contemplated for use.

Solid electrolyte interface 18 is associated with at least a portion of active material layer 22. As will be discussed in greater detail below, solid electrolyte interface 18 can be fabricated from anyone of a number of materials and is preferably the product of at least partial degradation of, for example, 1,6-dioxaspiro[4,4]nonane-2,7-dione (1,6 Spiro), 1,4-dioxaspiro[4,5]decane-2-one (1,4 Spiro), or bicyclic bis γ-lactone (BBL), or a lithium carboxylic acid salt. While solid electrolyte interface 18 has been disclosed as comprising spiro and cyclic ketones, it will be understood that disclosure such compounds are merely illustrative of acceptable materials, and are by no means intended to be the only suitable materials. Indeed, it will be understood that other materials that are inert with respect to the remainder of the cell and form a stable passivation or SEI layer on active material 22 are likewise contemplated for use. Preferably, such a passivation layer will not form a gas upon its own decomposition during cell cycling and storage. As will be discussed in greater detail below, solid electrolyte interface 18 serves to, among other things, increase the capacity and coulombic efficiency of electrochemical cell 10 relative to a cell without such an interface or passivation layer. While solid electrolyte interface 18 has been disclosed, for illustrative purposes only, as being associated with electrode 12, it is likewise contemplated that the interface can be associated with electrode 14 or both electrodes 12 and 14, respectively.

The present invention is also directed to a process for fabricating electrochemical cell 10 having a pre-passivated electrode. In a first embodiment of the invention the process comprises the following steps.

First, electrodes 12 and 14 are fabricated. For purposes of the present disclosure, electrode 12 will comprise an anode and electrode 14 will comprise a cathode. Of course, in a secondary cell configuration, the anode and cathode will become interchangeable with each other, depending on whether the cell is in a state of charging or discharging. It will be understood that electrodes 12 and 14 are fabricated using conventional techniques.

Second, lithium metal is dissolved in methyl-tetrahydrofuran (MeTHF) preferably with the assistance of a secondary agent such as naphthalene. While lithium metal has been disclosed as being dissolved in a particular solvent, other metals including, for example, Na, K, Rb, Cs, Fr, Be, Mg, Ca, Sr, Ba, Ra, as well as transition metals are likewise suitable for use—so long as they are soluble in a solvent either alone or with the assistance of a secondary agent. It will be understood that anyone of a number of solvents can be used depending upon the particular metal is being dissolved. Such solvents will be known to those having ordinary skill in the art having the present disclosure before them.

Third, active material 22 is associated with the solvent having the dissolved lithium. As previously discussed, active material 22 preferably includes a carbonaceous species such as carbon black or graphite.

Fourth, an additive, such as 1,4-Spiro, 1,6-Spiro, or BBL, is associated with the active material and dissolved metal, to, in turn, form a solid electrolyte interface layer 18 on active material 22. The additive reacts with the dissolved metal and active material and partially degrades. The at least partially degraded additive forms the solid electrolyte interface. As previously discussed, anyone of a number of SEI forming additives are suitable for use—so long as the particular additive is compatible with the remainder of the cell.

Fifth, the active material having the solid electrolyte interface is associated with current collecting substrate 20. It will be understood that active material layer having the SEI will be applied using conventional techniques. Once active material 22 is applied to substrate 20, first electrode 12 is fabricated. To complete fabrication of electrochemical cell 10 a second electrode and electrolyte are associated with the electrode 12. As previously discussed, an electrochemical cell fabricated in accordance with the present invention includes a solid electrolyte interface layer prior to an initial electrical charge. As such, only a nominal amount of the cell's capacity will be consumed during the initial charge discharge cycle because the passivation layer is already formed.

In an alternative process the active material can be associated with the additive and then the additive and active material can be associated with a previously prepared metal dissolved in a solvent.

In yet another alternative process the active material can be associated with, for example, metal salts of aromatic carboxylic acids and optionally treated with an additive.

The above description is merely exemplification of the present invention. Therefore, various change can be performed within the aspect of the present invention and can be exemplified as follows.

Collector Substrate

The materials usable for the collector substrate include, beside copper mentioned above, various metals such as aluminum, nickel, stainless steel, etc., and their alloys. Preferably aluminum is used for the collector substrate of the positive electrode and copper for the collector substrate of the negative electrode.

The thickness of the collector may be properly selected to suit the situation, but it is preferably 1 to 30 µm, more preferably 1 to 20 µm. A collector thickness of less than 1 µm tends to fail to provide sufficient mechanical strength, giving rise to the problems in battery production. On the other hand, when the collector thickness exceeds 30 μm, the capacity of the battery as a whole may be reduced.

The collector surface is preferably subjected to a roughening treatment in advance because this treatment contributes to the enhancement of adhesive strength of electrode material. Various methods such as mechanical polishing, electrolytic polishing and chemical polishing can be used for the surface roughening treatment. Mechanical polishing includes a method in which the collector surface is polished by a polishing cloth or paper having abrasive grains secured thereto, or by whetstone, emery buff or a wire brush comprising steel or other metal wires. An intermediate layer may be provided on the collector surface for elevating adhesive strength or conductivity.

As for the geometry of the collector, it may be metal mesh or plate.

Active Material

The active material used for the first electrode or the second electrode may be suitably selected according to the type and specific properties of the battery to be produced. In the present invention, a granular carbonaceous material such as carbon black or graphite is preferably used as the active material for the first or second electrode because use of such material is most conducive to deriving the maximal effect of the present invention.

In the case of lithium secondary battery, both inorganic compounds and organic compounds can be used as the positive electrode active material provided that they are capable of intercalating and releasing lithium ions. The inorganic compounds usable for the above purpose include chalcogen compounds, for example, transition metal oxides such as Mno, $V_2O_5$, $V_6O_{13}$ and $TiO_2$, lithium/transition metal composite oxides such as lithium nickelate, lithium cobaltate and lithium manganate, and transition metal sulfides such as $TiS_2$, FeS and $MoS_2$. As transition metal, Fe, Co, Ni, Mn and the like can be used. In order to improve their properties, these compounds may be partially substituted with elements. The organic compounds usable as the active material in the present invention include, for example, polyaniline, polypyrrole, polyacene, disulfide type compounds and polysulfide type compounds. Mixtures of these inorganic and organic compounds are also usable as the positive electrode material. Preferably, a composite oxide comprising lithium and at least one transition metal selected from the group consisting of cobalt, nickel and manganese is used.

The grain size of the positive electrode active material may be properly selected in accordance with other structural elements of the battery, but it is usually 1 to 30 μm, preferably 1 to 10 μm, because this range of grain size is especially effective for improving battery properties such as initial efficiency and charge/discharge cycle performance.

The above-mentioned granular carbonaceous materials are usually used as the negative electrode active material which is capable of occluding and releasing lithium ions. Such carbonaceous materials can be used in the form of a mixture or coated with a metal, metal salt, oxide, etc. Oxides or sulfates of metals such as silicon, tin, zinc, manganese, iron and nickel, metallic lithium, lithium alloys such as Li—Al, Li—Bi—Cd and Li—Sn—Cd, lithium transition metal nitrides and silicone are also usable as the negative electrode active material. In view of the improvement of battery properties such as initial efficiency, rate characteristics and cycle performance, the mean grain size of the negative electrode active material is usually not more than 12 μm, preferably not more than 10 μm. When the mean grain size is more than 12 μm, the electronic conductivity may be deteriorated. The lower threshold value of the mean grain size is usually 0.5 μm, preferably 7 μm.

Other Structural Components in the Electrode

A binder is preferably used for binding the active material on the collector. The inorganic compounds such as silicates and glass, and various types of resins mainly composed of polymers can be used as binder.

Examples of the resins usable as binder include alkane polymers such as polyethylene, polypropylene and poly-1,1-dimethylethylene; unsaturated polymers such as polybutadiene and polyisoprene; polymers having a ring such as polystyrene, polymethylstyrene, polyvinylpyridine and poly-N-vinylpyrrolidone; acrylic polymers such as polymethyl methacrylate, polyethyl methacrylate, polybutyl methacrylate, polymethyl acrylate, polyethyl acrylate, polyacrylic acid, polymethacrylic acid and polyacrylamide; fluorine resins such as polyvinyl fluoride, polyvinylidene fluoride and polytetrafluoroethylene; CN group-containing polymers such as polyacrylonitrile and polyvinylidene cyanide; polyvinyl alcohol-based polymers such as polyvinyl acetate and polyvinyl alcohol; halogen containing polymers such as polyvinyl chloride and polyvinylidene chloride and conductive polymers such as polyaniline. Mixtures, modified products, derivatives, random copolymers, alternating copolymers, graft copolymers and block copolymers of the above polymers are also usable.

The amount of the binder to be used is preferably 0.1 to 30 parts by weight, more preferably 1 to 15 parts by weight, based on 100 parts by weight of the active material. If the amount of the binder used is less than 0.1 part by weight, the produced electrode may prove unsatisfactory in strength. Use of the binder in excess of 30 parts by weight may invite a reduction of capacity and/or rate characteristics of the battery.

Conductive materials, reinforcing agents, and various other additives such as powder, filler, etc., that produce the specific functions may be contained as desired in the electrode. As the conductive material, it is possible to use any type of material which is capable of affording electroconductivity to the said active material by addition of an appropriate quantity, but usually powdery carbonaceous materials such as acetylene black, carbon black and graphite, and fibers and foils of various metals are preferably used. As the additives, for example, trifloropropylene carbonate, vinylene carbonate, 1,6-dioxaspiro[4,4]nonane-2,7-dione, 12-crown-4-ether and the like can be used for enhancing stability and service life of the battery. As reinforcements, various types of inorganic and organic spherical and fibrous fillers, etc., can be used.

As the technique for forming the electrode on the collector, a method is favorably used in which a powdery active material is mixed with a solvent along with a binder and dispersed by a suitable means such as ball mill, sand mill, double-screw kneader, etc., to prepare a coating compound, and this coating compound is applied on the collector and dried. The type of the solvent used in this method is not restricted as far as it is inert to the electrode material and capable of dissolving the binder used. Both inorganic and organic solvents generally used in the art, such as N-methylpyrrolidone for instance, can be used in the present invention.

A layer of electrode material can also be formed, for instance, by a method in which the active material is mixed with a binder and heated into a softened state, and the mixture is coated on the collector by means of press bonding or spraying. It is also possible to form the electrode material layer by calcining the active material singly on the collector.

The thickness of the active material layer is usually not less than 1 µm, preferably not less than 10 µm. Also, it is usually not more than 200 µm, preferably not more than 150 µm. When the active material layer thickness is less than 1 µm, it becomes difficult to secure uniformity of the active material layer, and the battery capacity tends to lower. When the active material layer thickness exceeds 200 µm, rate characteristics may be deteriorated.

In order to further improve adhesion of the active material layer to the collector substrate, a primer layer may be provided between them. Such a primer layer can be formed by applying a coating composition comprising a conductive material, a binder and a solvent on the collector substrate and drying the coat.

As the conductive material of the primer layer, various types of material, for example, granular carbonaceous materials such as carbon black and graphite, metal powder, conductive polymers, etc., can be used. The binder and the solvent used for the primer layer may be the same as used for the active material layer described above. The primer layer thickness is usually not less than 0.05 µm, preferably not less than 0.1 µm. Also, it is usually not more than 20 µm, preferably not more than 10 µm. When the primer layer thickness is less than 0.05 µm, it becomes difficult to secure uniformity of the primer layer. When the layer thickness exceeds 20 µm, the capacity rate characteristics of the battery tends to deteriorate.

Electrolyte

Electrolyte takes part in the movement of ions between the first and second electrodes in relation to the respective electrodes. Electrolyte usually exists as an electrolyte layer between the electrodes, but it also is present in the active material layer and contacts with the surface of at least part of the active material.

Electrolyte is usually available in various forms including electrolytes having fluidity (liquid electrolytes) and non-fluid electrolytes such as gel-like electrolyte and perfectly solid electrolyte. From the viewpoint of battery performance, liquid electrolyte or gel-like electrolyte is preferred, but from the safety standpoint, non-fluid electrolyte is preferred. It is noticeable that use of non-fluid electrolyte assures more effective prevention of liquid leakage than in the batteries using conventional liquid electrolyte.

Liquid electrolyte is usually produced by dissolving a supporting electrolyte in a non-aqueous solvent.

It is possible to use any type of supporting electrolyte as far as it is stable to the positive and negative electrodes, and is a non-aqueous material whose lithium ions can make movement for undergoing a electrochemical reaction with the positive or negative electrode active material. For instance, lithium salts such as $LiPF_6$, $LiAsF_6$, $LiSbF_6$, $LiBF_4$, $LiClO_4$, $LiI$, $LiBr$, $LiCl$, $LiAlCl$, $LiHF_2$, $LiSCN$ and $LiSO_3CF_2$ can be used as supporting electrolyte. Of these lithium salts, $LiPF_6$ and $LiClO_4$ are preferred.

The concentration of the supporting electrolyte when used in a state of being dissolved in a non-aqueous solvent is usually 0.5 to 2.5 mol/L. The type of the non-aqueous solvent used for dissolving the supporting electrolyte is not restricted, but a solvent of a relatively high dielectric constant is preferably used. Examples of such solvents include cyclic carbonates such as ethylene carbonate and propylene carbonate, non-cyclic carbonates such as dimethyl carbonate, diethyl carbonate and ethyl methyl carbonate, glymes such as tetrahydrofuran, 2-methyltetrahydrofuran and dimethoxyethane, lactones such as γ-butyrolactone, sulfur compounds such as sulforane, and nitrites such as acetonitrile. Mixtures of these solvents are also usable.

Among the above solvents, one or two or more solvents selected from cyclic carbonates such as ethylene carbonate and propylene carbonate and non-cyclic carbonates such as dimethyl carbonate, diethyl carbonate and ethyl methyl carbonate are preferably used. Those of the above solvents in which part of the hydrogen atoms in the molecule were substituted with a halogen, etc., are also usable. These solvents may contain additives. Additives such as trofluoropropylene carbonate, vinylene carbonate, 1,6-dioxaspiro [4,4]nonane-2,7-dione and 12-crown-4-ether can be used for the purpose of enhancing stability, performance and service life of the battery.

The gel-like electrolyte used for the battery of the present invention is usually of a structure in which the said liquid electrolyte is held by a polymer. That is, a gel-like electrolyte is a type of liquid electrolyte which is held in a polymer network and excessively lowered in fluidity as a whole. Such gel-like electrolytes are closely analogous to the ordinary liquid electrolytes in properties such as ion conductivity, but their fluidity and volatility are excessively suppressed and therefore elevated in safety. The ratio of the polymer in the gel-like electrolyte is preferably 1 to 50% by weight. If the polymer ratio is less than 1% by weight, it may prove hardly possible for the polymer to hold the liquid electrolyte, resulting in causing a liquid leakage. If the polymer ratio exceeds 50% by weight, ion conductivity lowers to deteriorate the battery performance.

The polymers usable for the gel-like electrodes are not specified; it is possible to use any of the polymers which are capable of forming a gel with the liquid electrolyte, and which include those produced from polycondensation of polyesters, polyamides, polycarbonates, polyimides and the like, those produced from polyaddition of polyurethanes and polyureas, and those produced from addition polymerization, for example, acrylic derivative-based polymers such as polymethyl methacrylate and polyvinyl polymers such as polyvinyl acetate, polyvinyl chloride and polyvinylidene fluoride. Polyacrylonitrile and polyvinylidene fluoride can be cited as preferred examples of the said polymers. Here, polyvinylidene fluoride not only denotes homopolymers of vinylidene fluoride but also includes copolymers with other monomers such as hexafluoropropylene. The acrylic derivative-based polymers produced by polymerizing such monomers as acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinylpyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate and the like are also preferably used.

The weight-average molecular weight (Mw) of the electrolyte polymer used in the present invention is usually in the range of 10,000 to 5,000,000. When Mw of the said polymer is less than 10,000, gel is hard to form. When Mw of the polymer exceeds 5,000,000, the polymer is difficult to handle because of too high viscosity. The concentration of the polymer in the electrolyte may be properly selected according to the molecular weight of the polymer used, but it is preferably 0.1 to 30% by weight. When the polymer concentration is less than 0.1% by weight, gel is hard to form and also the electrolyte maintainability of the polymer falls to give rise to the problem of too high fluidity and liquid leakage. When the polymer concentration exceeds 30% by weight, the liquid viscosity becomes too high, making it difficult to carry out the operations. Also, the ratio of the electrolyte lowers to reduce ion conductivity, causing a corresponding deterioration of the battery properties such as rate characteristics.

It is possible to use an electrolyte of a perfectly solid state. Various known solid electrolytes are usable in the present invention. A solid electrolyte can be formed, for instance, by mixing a polymer such as used in the said gel electrolyte with a supporting electrolyte salt in a suitable ratio. In this case, in order to enhance conductivity, it is preferable to use a polymer of high polarity and of a skeletal structure having many side chains.

Solid Electrolyte Interfacial (SEI) Layer

The solid electrolyte interfacial layer containing a metal such as lithium is formed on at least a part of the active material grain surfaces and contributes to the improvement of battery performance. Before forming the active material layer, such a solid electrolyte interfacial layer which is formed prior to application of the initial electrical charge, can be formed by a method in which an appropriate additive (s) is allowed to exist on the active material surface and subjected to a contact treatment by suitable means such as heat treatment. By this contact treatment, the additive is decomposed, polymerized and/or reacted with the active material to form at least part of the solid electrolyte interface.

Various additives such as mentioned above can be used for forming the solid electrolyte interface. Among the above-mentioned additives, the aromatic compounds having aromatic rings such as phenyl group, naphthalene group, perylene group, pyridine group, etc., are preferably used. Especially when a granular carbonaceous material is used as the active material, the said aromatic compounds can derive the maximal effect of the present invention as their carbon skeletal structure resembles that of the active material. Of these aromatic compounds, those having a substituent group such as carboxyl group, sulfonic group or phosphoric group are preferred. These aromatic compounds are preferably metal salts, more preferably salts of the Group I and/or Group II metals, especially lithium salts. The molecular weight of these additives is usually not more than 1,000, preferably not more than 500, more preferably not more than 300. Further, these aromatic compounds preferably do not contain nitrogen and/or phosphorus in order to prevent from generating by-products in the contacting step, which by-products may deteriorate the cell performance and productibility of the cell.

In the contacting step, the amount of the aromatic compound based on 100% by weight of the active material is usually 0.1 to 100% by weight, preferably 1 to 50% by weight. When the amount of the aromatic compound is too small, the obtained effect may be insufficient, and when the amount of the aromatic compound is too large, the cell performance may be deteriorated.

In the present invention, at least part of the solid electrolyte interface is formed by use of the above mentioned additive before initial charging. And then, during initial charging, a coating film may be further formed on the active material grain surfaces or the partly formed solid electrolyte interfacial surfaces (these surfaces may hereinafter be referred to generically as active material surfaces) to form a more preferable solid electrolyte interface. The said coating film can be formed by a method in which an appropriate additive is allowed to exist on the active material surface by, for example, having the additive contained in the electrolyte, and reacted on the active material surface during initial charging. In this reaction during initial charging, usually not only the said additive but also the supporting electrolyte and non-aqueous solvent, which are the electrolyte components, take part.

As the additive used for forming the coating film during initial charging, it is possible to use, beside those mentioned above, carbonates such as vinylene carbonate, trifluoropropylene carbonate and catechol carbonate, cyclic or chain esters such as 1,6-dioxaspiro[4,4]nonane-2,7-dione, cyclic ethers such as 12-crown-4-ether, acid anhydrides such as glutaric anhydride and succinic anhydride, cyclic ketones such as cyclopentanone and cyclohexanone, sulfur-containing compounds, e.g. those containing sultones such as 1,3-propanesultone and 1,4-butanesultone or thiocarbonates, and nitrogen-containing compounds, e.g. those containing imides. Acid anhydrides and esters are preferred. The molecular weight of these additives is usually not more than 1,000, preferably not more than 500, more preferably not more than 300. When the molecular weight of the additive exceeds 1,000, the influence of the detrimental factors for charge and discharge may rise up, causing impairment of ion conductivity to produce a reverse effect.

The electrochemical cell according to the present invention has the electrode having a solid electrolyte interface layer prior to application of the initial electrical charge. Therefore, the electrochemical cell is capable of preventing from reducing capacity and coulombic efficiency. Accordingly, the present invention is greatly valuable for industry.

EXAMPLES

The present invention is further illustrated by showing the examples thereof, but the invention is not limited to these examples.

The following materials were used as components of the composition.

Reference Example 1

General Material Preparation

First, a container suitable for ball milling was charged with graphite and the desired ratio of aromatic salt. Second, stainless steel beads were added to the container. The container was then sealed and placed on the ball mill for approximately twelve hours. Next, the stainless steel beads were removed from the container and the graphite was charged into a quartz tube, which was equipped with a gas inlet and outlet. Next, the tube was purged with argon at rate of 1.0 L/min for approximately 1 hour. While maintaining the same argon flow, the tube was placed in a furnace and heated to 600 degrees centigrade for approximately 7.5 hours. The sample was then cooled to room temperature for approximately 12 hours with an argon purge rate of around 0.2 L/min. The sample was removed from the quartz tube in a dry room and stored for later use.

Reference Example 2

Electrode Preparation

Electrode were prepared by mixing the above-prepared active material with a conventional polymeric binder dissolved in organic solvent. The mixture was coated onto a conventional current collector using a BYK-Gardner Multi Clearance Applicator, cured for approximately 2 hours at 150 degrees centigrade, and then compressed approximately 10% using conventional techniques. In this case the polymeric binder comprised about 90% toluene, 9% Kraton D1116G (Shell Oil Co.) and 1% butadiene sulfone (Aldrich Chemical Co.). Round electrodes were formed using a conventional circular die cutter.

Reference Example 3
Coin Cell Fabrication and Material Testing

After fabrication the electrodes were then tested in a Hohsen 2032, coin cell test apparatus. Lithium metal was used as the counter electrode and a 1 molar solution of $LiAsF_6$ dissolved in propylene carbonate (PC) served as the non-aqueous electrolyte. In some of the experiments below an additive was formulated into the electrolyte for comparative purposes.

Example 1

Approximately 1.0 grams of SFG-6 graphite and approximately 0.3 grams of perylene tetracarboxylic acid tetra potassium salt (PTCATK) were charged into a 20 ml glass scintillation vial. Next, several 0.19 inch diameter stainless steel balls were charged into the vial and the mixture was dry ball milled for approximately 12 hours. The active material was then separated from the mixing media and the scintillation vial was charged into a 1 inch diameter by 18 inches long quartz tube. The comparative or control cell was prepared in accordance with the process of Example 1 except that the addition of PTCATK was omitted from the process.

Figure 2:
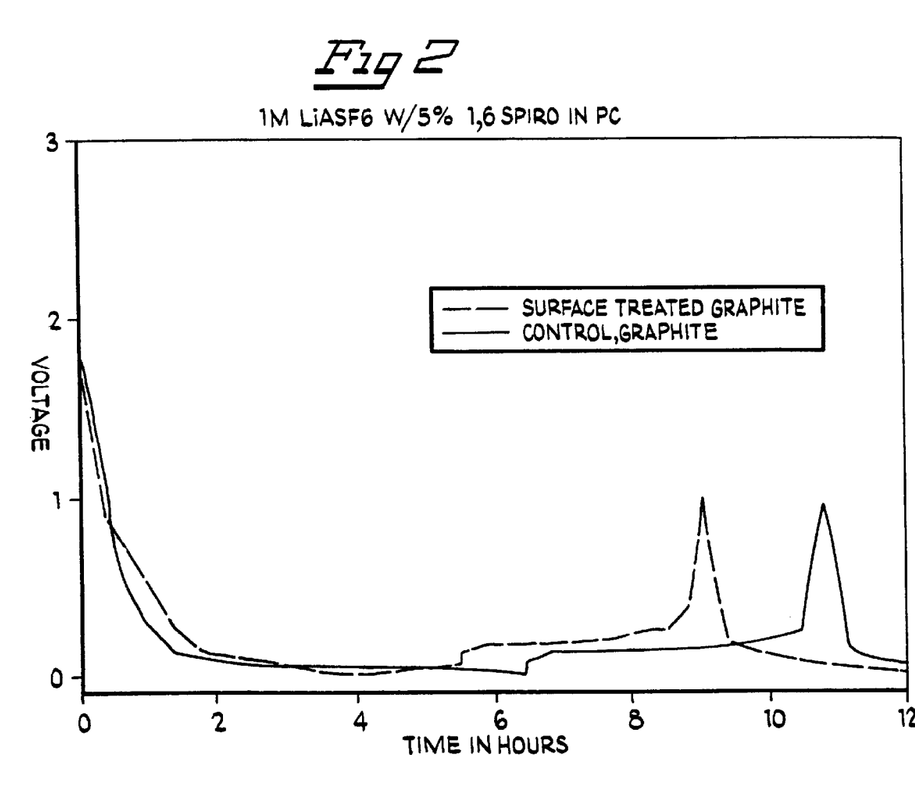
FIG. 2 is a plot of voltage versus time for a coin cell fabricated in accordance with experiment number 1 relative to a control.

Results comparing the materials of these Experiments are shown in FIG. 2. Note than an additive 1,6 spiro was added to the electrolyte to prevent electrolyte decomposition. The results clearly demonstrate the benefit of incorporating the lithium carboxylic acid salt, namely, increased capacity, reduced first cycle decomposition, and improved conductivity are all evident from these results.

Example 2

Figure 3:
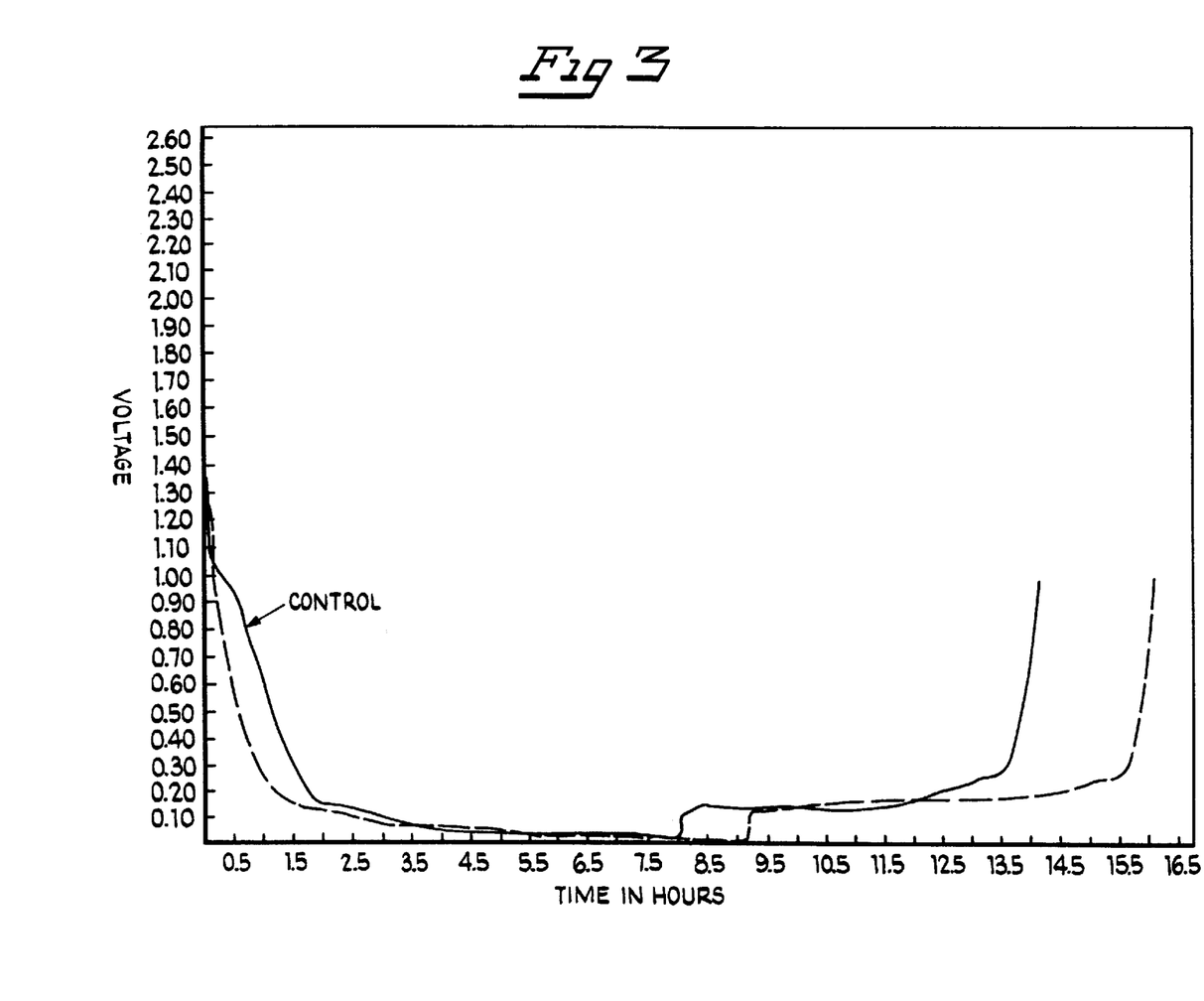
FIG. 3 is a plot of voltage versus time for a coin cell fabricated in accordance with experiment number 2 relative to a control.

The process of Example 1 was followed except that approximately 0.1 grams of lithiumpicinolate was used instead of 0.3 grams of PTCATK. Test results are provided in FIG. 3, which show, among other things, the improved electrochemical performance relative to a control—without the lithium carboxylic acid salt.

Example 3

Figure 4:
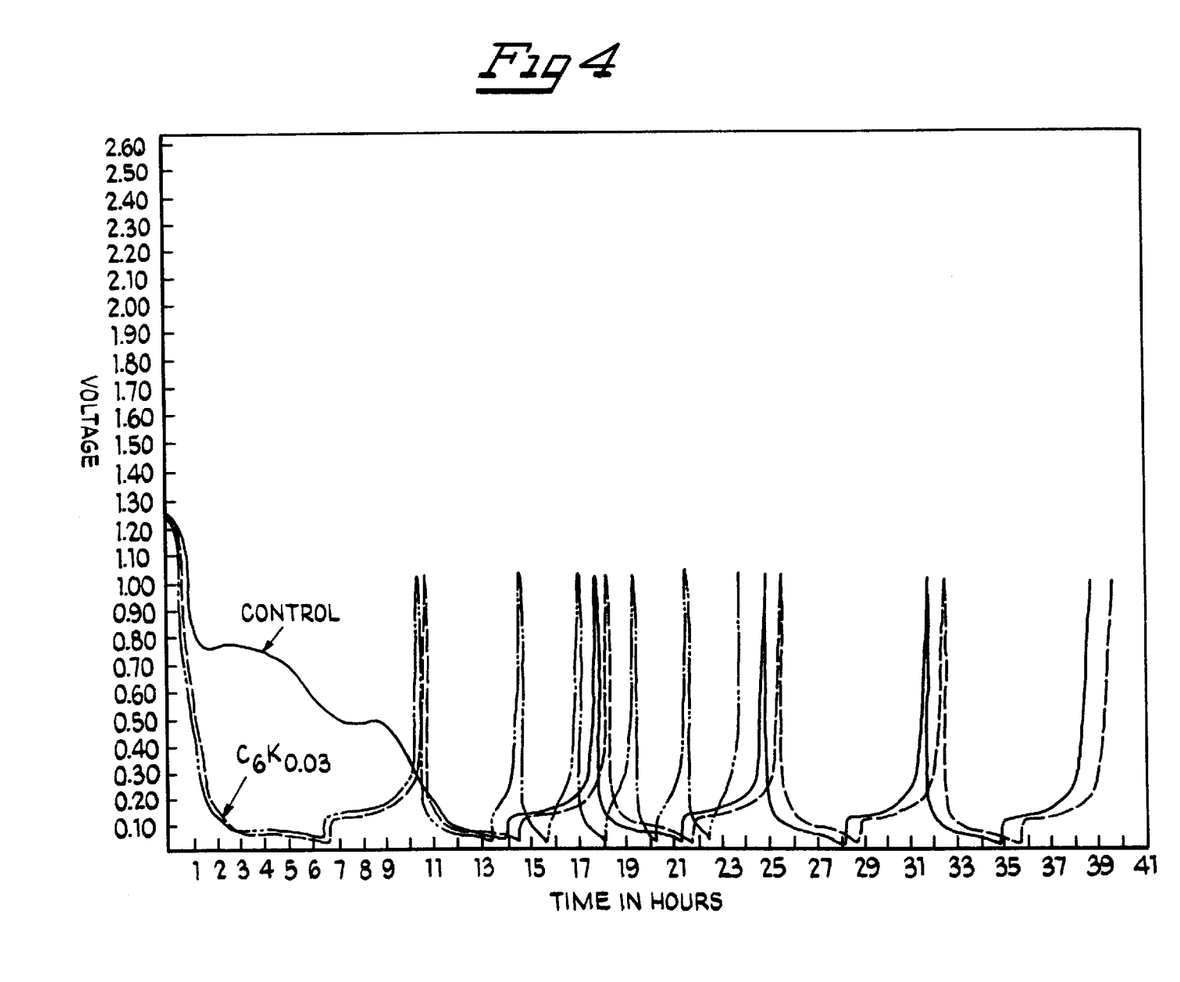
FIG. 4 is a plot of voltage versus time for a coin cell fabricated in accordance with experiment number 3 relative to a control.

The process of Example 1 was followed except that no spiro additive was added to the electrolyte. Test results are provided in FIG. 4, which show, among other things, the improved electrochemical performance relative to a control—without the lithium carboxylic acid salt.

Example 4

Figure 5:
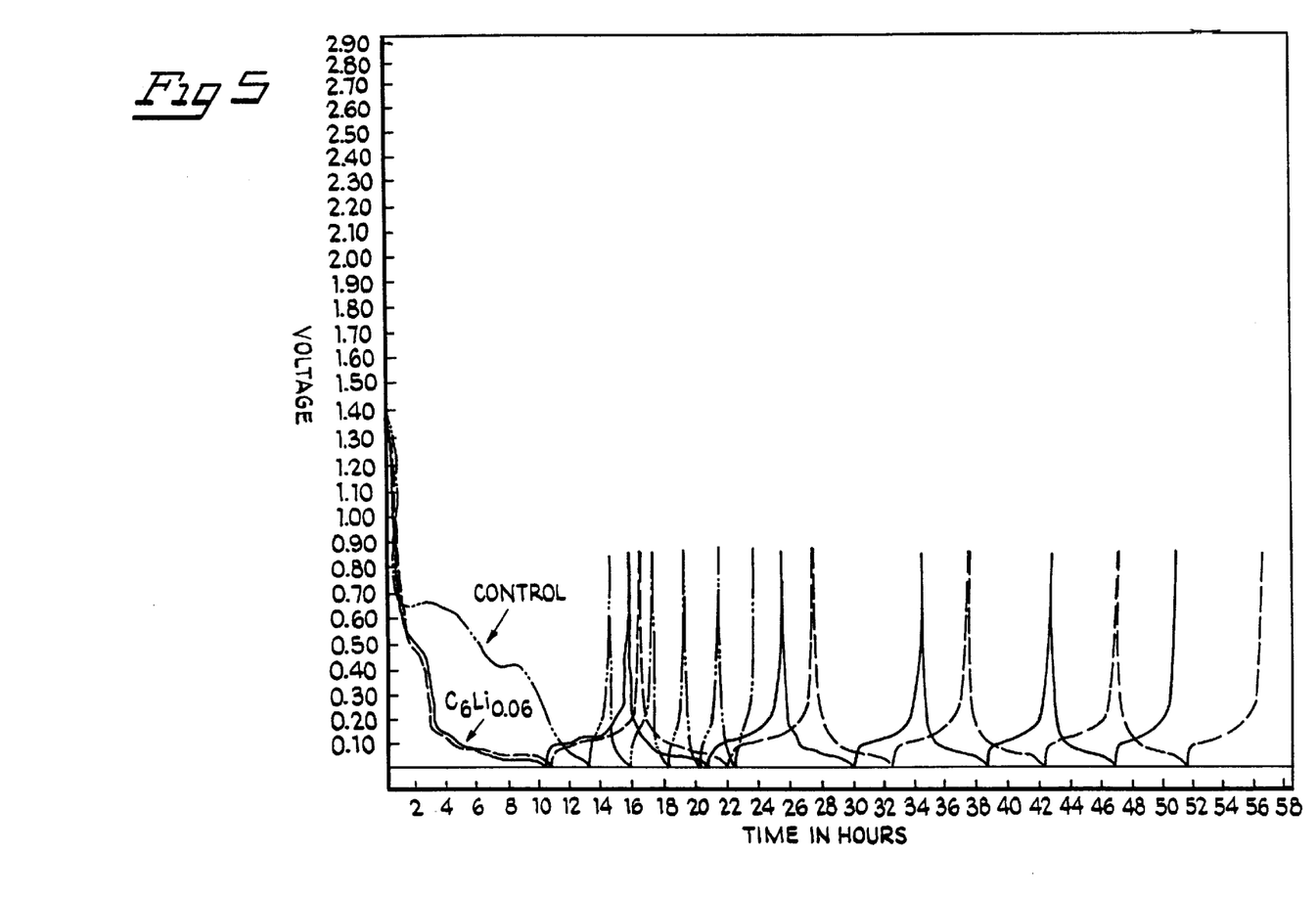
FIG. 5 is a plot of voltage versus time for a coin cell fabricated in accordance with experiment number 4 relative to a control.

The process of Example 2 was followed except that no spiro additive was added to the electrolyte. Test results are provided in FIG. 5, which show, among other things, the improved electrochemical performance relative to a control—without the lithium carboxylic acid salt.

Example 5

Figure 6:
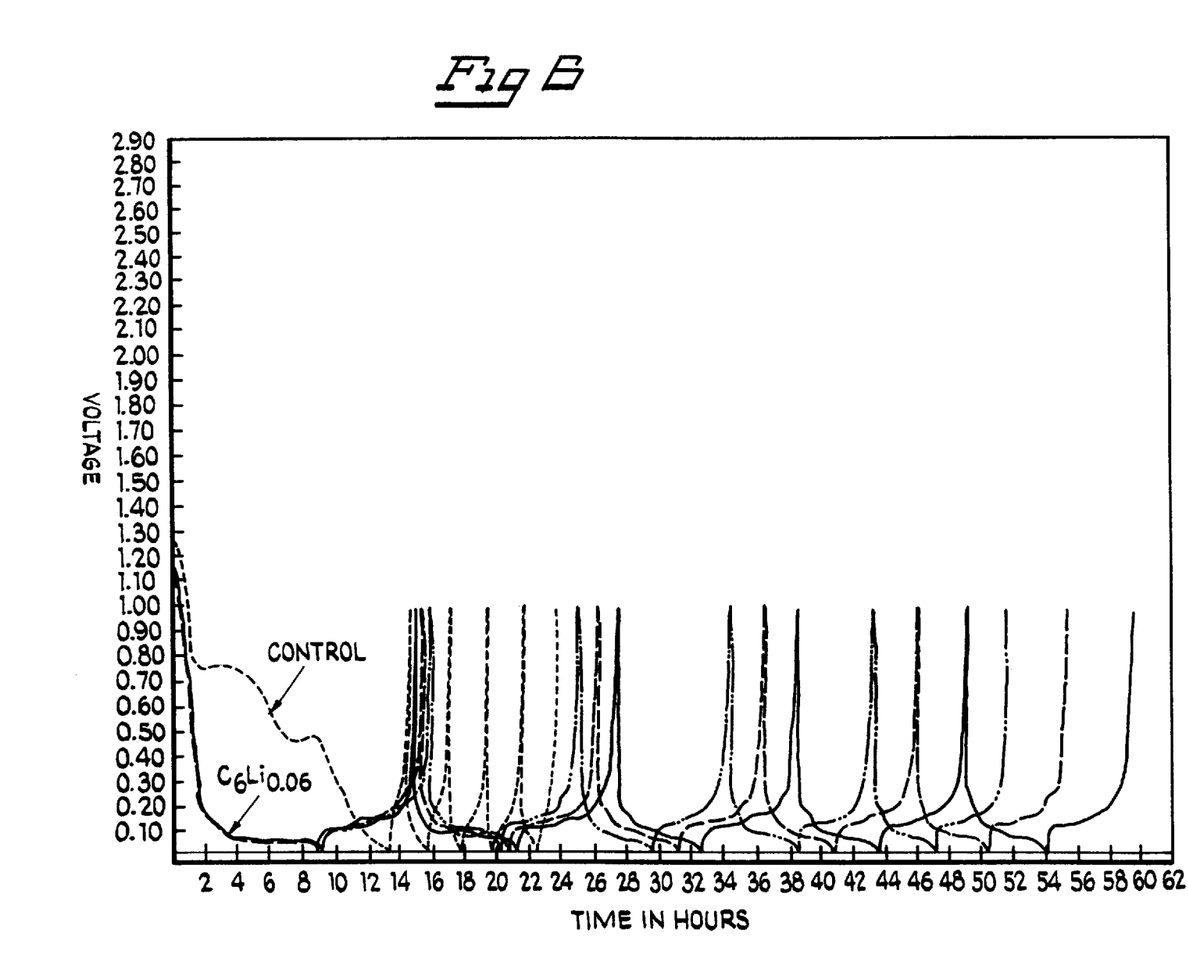
FIG. 6 is a plot of voltage versus time for a coin cell fabricated in accordance with experiment number 5 relative to a control.

The process of Example 1 was followed except that 0.11 grams of lithium benzoate was used instead of 0.3 grams of PTCATK. Test results are provided in FIG. 6, which show, among other things, the improved electrochemical performance relative to a control—without the lithium carboxylic acid salt.

What is claimed is:

1. An electrode for an electrochemical cell comprising:
    a current collecting substrate;
    an active material layer associated with the substrate; and
    solid electrolyte interface layer associated with the active material layer,
    the solid electrolyte interface layer containing a lithium salt of aromatic carboxylic acid.

2. The electrode according to claim 1, wherein the current collecting substrate comprises a metallic mesh.

3. The electrode according to claim 1, wherein the active material layer include at least one kind of carbonaceous particle.

4. An electrochemical cell comprising a first electrode, a second electrode and an electrolyte associated with said first and second electrodes,
    at least one of said first electrode and second electrode comprising a current collecting substrate and an active material layer associated with said current collecting substrate,
    a solid electrolyte interface containing a lithium salt of aromatic carboxylic acid being formed on at least one part of surface of the active material.

5. The electrochemical cell according to claim 4, wherein the current collecting substrate of at least one of said first electrode and second electrode comprises a metallic mesh.

6. The electrochemical cell according to claim 4, wherein the active material layer of at least one of said first electrode and second electrode include at least one kind of carbonaceous particle.

* * * * *